Figure 1:
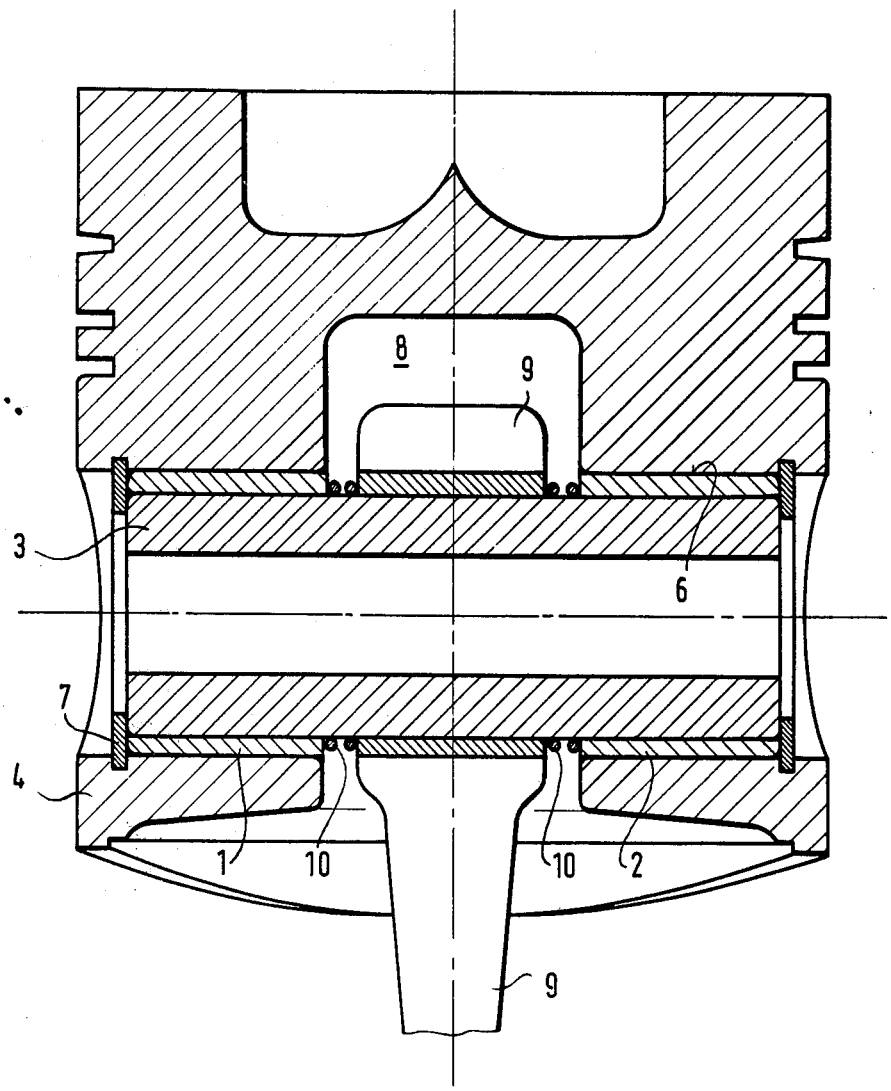

United States Patent [19]
Mölle et al.

[11] 4,291,614
[45] Sep. 29, 1981

[54] PISTON AND PROCESS FOR ITS MANUFACTURE

[75] Inventors: Egon Mölle, Oberasbach; Fritz Rösch, Schwabach, both of Fed. Rep. of Germany

[73] Assignee: Alcan Aluminiumwerk Nürnberg GmbH, Nuremberg, Fed. Rep. of Germany

[21] Appl. No.: 51,360

[22] Filed: Jun. 25, 1979

[30] Foreign Application Priority Data

Jun. 28, 1978 [DE] Fed. Rep. of Germany ....... 2828402

[51] Int. Cl.³ .............................................. F16J 1/18
[52] U.S. Cl. ....................................... 92/187; 92/222; 123/193 P; 403/158
[58] Field of Search ................ 92/187, 222, 238, 188, 92/189, 190, 191; 123/193 P; 29/156.5 R; 308/237 R, 2 R; 403/158, 157

[56] References Cited

U.S. PATENT DOCUMENTS

| | | | |
|---|---|---|---|
| 615,683 | 12/1898 | Day | 308/327 R |
| 1,790,664 | 2/1931 | Horton | 29/156.5 R |
| 1,921,044 | 8/1933 | Sparrow | 308/327 R |
| 2,422,327 | 6/1947 | Winslow | 403/158 X |
| 2,566,080 | 8/1951 | Davids | 92/187 |
| 2,703,264 | 3/1955 | Pitner | 92/187 |
| 2,850,340 | 9/1958 | Brill | 92/187 |
| 2,964,364 | 12/1960 | Morgan | 92/187 |
| 3,161,185 | 12/1964 | Justinien et al. | 92/187 X |
| 3,495,859 | 2/1970 | Hassan | 403/157 X |

FOREIGN PATENT DOCUMENTS

| | | | |
|---|---|---|---|
| 1291955 | 4/1969 | Fed. Rep. of Germany . | |
| 622998 | 3/1927 | France | 308/237 R |
| 107152 | 6/1917 | United Kingdom | 308/237 R |
| 161903 | 4/1921 | United Kingdom | 92/187 |

*Primary Examiner*—Irwin C. Cohen
*Attorney, Agent, or Firm*—Cooper, Dunham, Clark, Griffin & Moran

[57] ABSTRACT

An internal combustion engine piston is fitted with bushes between its piston pin and the cross bore in the piston. The diameters of the piston pin and the piston cross bore are dimensioned independently of each other to meet the requirements imposed upon them, which allows the piston pin to be dimensioned only to such size as is required to withstand the bending stress imposed by the connecting rod, thus permitting the size of the piston pin and the reciprocating mass to be reduced in relation to conventional practice.

10 Claims, 2 Drawing Figures

PISTON AND PROCESS FOR ITS MANUFACTURE

The present invention relates to the manufacture of pistons, particularly for internal combustion engines, and having therein a cross bore to receive the ends of a piston pin, which secures the piston to a connecting rod.

In heavy duty engines, particularly heavy duty diesel engines, having a cylinder diameter of 90 mm or more, the dimension of the piston pins has been selected by reference to the requirements of the bearing areas provided by the piston cross bore to withstand the forces imposed through the piston pin. In conventional practice the piston pin is hardened steel and the piston is formed from a light metal, which is soft and ductile as compared with the piston pin. In consequence the piston pin was far stronger than was required to withstand the bending stresses imposed upon it by the connecting rod. Consequently there was frequently excessive moving mass in both the connecting rod and the piston.

When light metal pistons were first employed in place of grey cast iron pistons it was appreciated that the softer light metal required a larger bearing area between the piston pin and the piston. Because it was sometimes impossible to increase the dimensions of the connecting rod, stepped piston pins were employed. The diameter of the ends of the piston pins were increased to provide an increased bearing area in the cross bore.

In German Patent Specification No. 1291955 on the other hand the strength of the piston pin was increased because heavier stresses were required to be imposed on the piston. In order to stiffen the piston pin, bushes were non-rotatably mounted on the ends of the piston pin so that it became in effect a stepped piston pin.

In the present invention on the other hand the piston pin is selected at a size appropriate to the bending stresses to be imposed on it by the connecting rod and the diameter of the cross bore in the piston is selected to provide a desired bearing area to receive stresses transmitted between it and the piston pin. The space between the piston pin and the bore in the piston is filled by a pair of bushes, which are of a material sufficiently strong to withstand the stress from the piston pin. Thus the bushes may be steel, titanium or even a very strong aluminium alloy or bearing bronze. This arrangement allows a significant decrease in weight of the reciprocating mass of piston and pin because the piston pin and the connecting rod may now be designed with reference to the stress transmitted between them rather than with reference to the necessary size of the seating in the cross bore of the piston.

The piston bushes are preferably arranged so that they float (are rotatable) in the piston cross bore. The piston pin may either float in the bushes or be tight (non-rotatable) in the bushes.

It may be advantageous if the outside diameters of the bushes decrease towards the axis of the piston. In this way, a gap which increases towards the axis of the piston is created between the piston pin bore and the cylindrical bushes, which gap, during operational loading and as a result of the deflection and resulting oval forming effect of the piston pin that occur and the deformation of the piston itself under thermal and mechanical loads, ensures that the surface pressure between the piston pin and the piston cross bore is evened out over the length of the bore. The reduction in the outside diameter of the bushes is intended to correspond to the local deformations of the pin and the piston under maximum operating load. Preferably for this purpose the external surface of the bush is tapered for one quarter to one half its total length.

Figure 2:
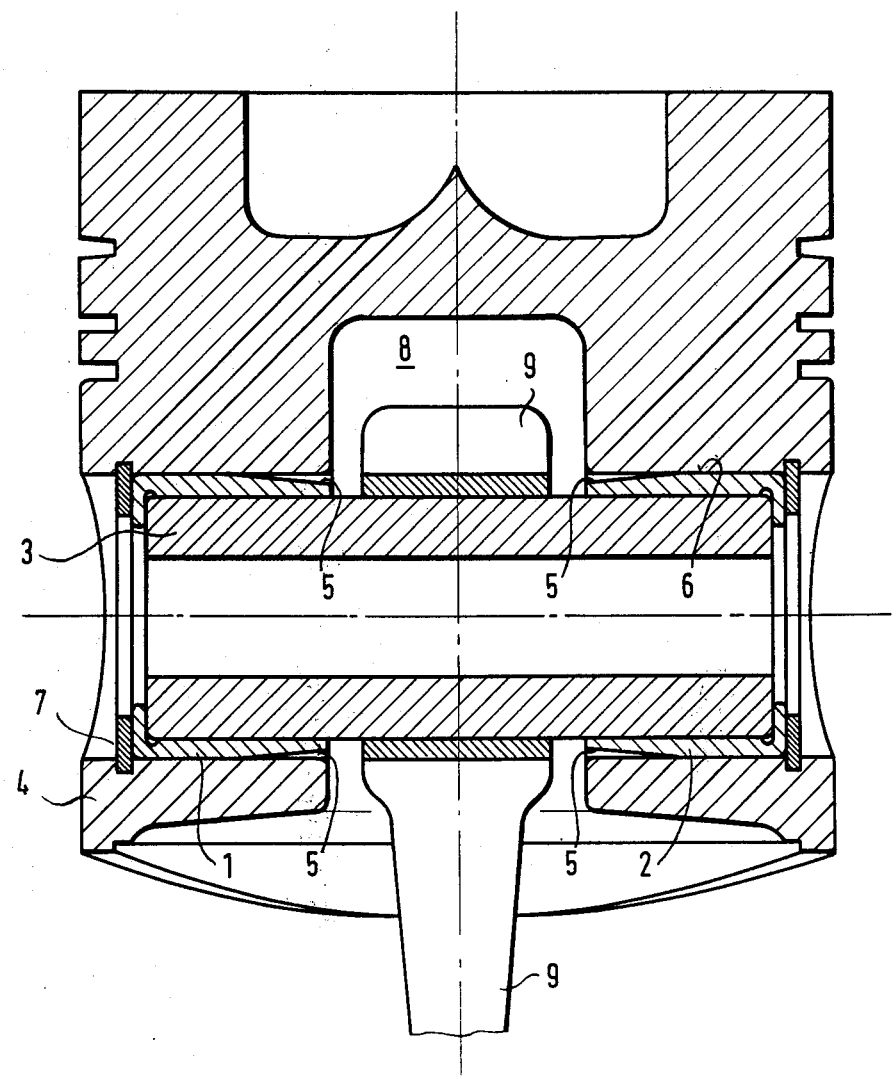

For the purpose of further explaining the invention, two particularly advantageous embodiments will now be described in greater detail by reference to the attached drawing, in which:

FIG. 1 shows one of these embodiments in an axial section through the piston and piston pin, and FIG. 2 illustrates the other embodiment in the same manner of presentation as in FIG. 1.

In both embodiments, the diameter of the piston pin and that of the bore for this pin are dimensioned independently of each other to suit the requirements imposed upon them in accordance with the invention. The diameter of the bore 6 for receiving the pin in the piston 4 not being very much greater than the outside diameter of the piston pin 3 itself. In both embodiments, cylindrical bushes 1 and 2 are provided between the piston pin and the piston pin bore 6 at each end of the piston pin 3, which bushes fill the gap between the piston pin and its bore. These cylindrical bushes may be a light or a loose fit on the piston pin 3. At their outer ends circlips 7 are provided in the piston pin bore 6 to prevent longitudinal outward movement of the bushes in the piston bore. As already stated the bushes may be made of a material which has a greater strength than the material of the piston.

In the piston illustrated in FIG. 1 the pin bore 6 extends as far as the receiving space 8 for the connecting rod 9 coaxially with the piston 4, its edge being merely slightly radiused at the zone where it joins the receiving space 8. In order to achieve centering or precise axial positioning of the two cylindrical bushes 1, 2 in the bore 6, helical springs 10 are provided, which are supported in the axial direction between the connecting rod 9 and the end faces of the two bushes 1, 2.

In the piston illustrated in FIG. 2 there are no springs of this kind. Instead, the outside diameter of the two bushes 1 and 2 progressively diminishes at their inner ends towards the axis of the piston, so that the inner end of the wall of the bushes is continuously tapered in this zone 5. Thereby an automatic centering of the bushes in the piston pin bore 6 can be achieved, so that the springs 10 provided in the example of embodiment according to FIG. 1 are not here required.

In FIG. 2 an inwardly turned lip on each of the bushes 1, 2 is held securely between the end of the piston pin 3 and a circlip 7. This holds the bushes 1, 2 and the piston pins 3 against endwise movement.

The taper angle of the end portion 5 of the bushes is expediently between 6 and 20'. The taper may serve to even out the surface pressure between the surface of the pin and the wall of the piston cross bore of the piston pin, which is rendered irregular during service through the deformation of the pin, bore and piston caused by the operating load.

What we claim is:

1. A piston, in particular for internal combustion engines, having a piston pin bore receiving an essentially rigid, cylindrical piston pin which serves to secure a piston rod, wherein between the pin and the bore, at or near the two ends of the pin, cylindrical bushings are provided which float rotatably in the piston pin bore, and means are provided for preventing axial displacement of the bushings beyond the ends of the pin, characterized in that the bushings are disposed floatingly on the piston pin and the external diameter of the bushings diminishes towards the axis of the piston.

2. Piston according to claim 1, characterised in that at least a portion of the external surface of the bushings is continuously tapered.

3. A piston according to claim 1, wherein the cylindrical walls of the bushings taper in longitudinal section at the end of each bushing nearer to the axis of the piston.

4. A piston according to claim 3 wherein the taper angle is 6 to 20'.

5. A piston according to claim 1 wherein the bushings are made of a material of greater strength than the material of the piston.

6. A piston according to claim 1, in which spring elements, acting in the axial direction of the piston pin, are provided between a connecting rod mounted on the piston pin and the adjacent end face of each bushing.

7. A piston according to claim 1, wherein the displacement-preventing means comprises stop elements which are secured in the bore for the piston pin and are so disposed that the bushings each bear, at their outer end, against said stop elements.

8. A piston according to claim 7 wherein each bushing has an inwardly turned lip at its outer end, said lips bearing respectively against the two end faces of the piston pin.

9. A piston according to claim 7, wherein each stop element is a circlip of rectangular cross-section.

10. A piston, in particular for internal combustion engines, having a piston pin bore receiving an essentially rigid, cylindrical piston pin which serves to secure a piston rod, wherein between the pin and the bore, at or near the two ends of the pin, cylindrical bushings are provided which float rotatably in the piston pin bore, and means are provided beyond each end of the pin for preventing axial displacement of the bushings beyond the ends of the pin, characterized in that the bushings are disposed floatingly on the piston pin, wherein each of said bushings has an in-turned flange at its outer end, interposed between and engaging the end of the pin at which the bushing is disposed and the displacement-preventing means beyond that pin end, for preventing axial displacement of the bushings.

* * * * *